Aug. 9, 1966  C. W. ATTWOOD  3,266,051
POLYGONAL, TELESCOPING, TUBULAR MEMBERS
Filed July 2, 1962
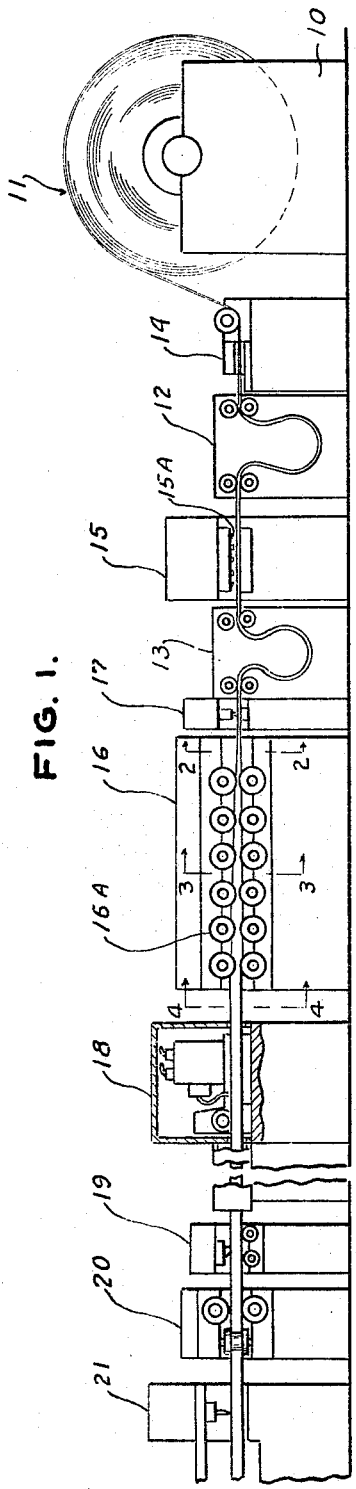
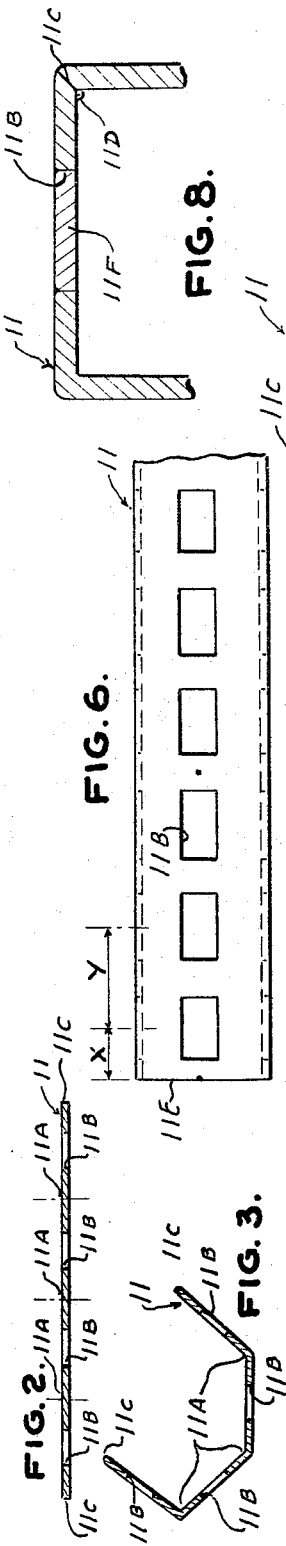
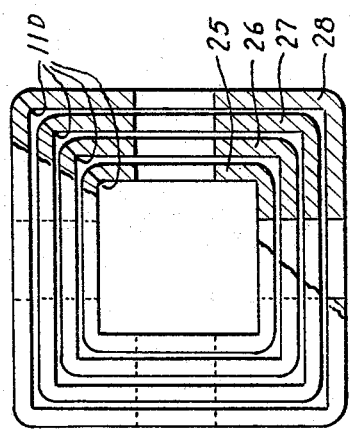
INVENTOR.
Charles W. Attwood
BY
ATTORNEYS

United States Patent Office 3,266,051
Patented August 9, 1966

1

3,266,051
POLYGONAL, TELESCOPING, TUBULAR
MEMBERS
Charles W. Attwood, 4077 2nd St., Wayne, Mich.
Filed July 2, 1962, Ser. No. 206,888
3 Claims. (Cl. 52—100)

This invention relates to the method of manufacture of geometrically polygonal tubing and its construction as a new article of manufacture for load-carrying structural and other purposes, and more particularly to a new method of tube manufacture incorporating recent welding developments and to new articles manufactured by such method.

New techniques of ultrahigh-frequency resistance welding, such as described in the H. E. Park Patent No. 2,794,108, and the W. C. Rudd et al. Patent No. 2,818,488 make possible, using the present invention, practical, efficient and high speed production of polygonal tubing rolled continuously from flat strip metal, both ferrous and non-ferrous, and its incorporation into continuous production lines including punch presses or other perforation producing means.

Heretofore, polygonal tubing has been manufactured by first forming the material to round cross-section, welding the edges together, and then running the finished tube through rolls or presses forming it to polygonal cross section. In the present method, the tube is initially roll-formed to its polygonal shape with the strip edges meeting at a longitudinal corner, and the edges are then welded, preferably using the aforementioned ultrahigh-frequency resistance technique. It is, of course, possible to use other methods of corner welding, but at present such methods are too slow for economical operation.

Other continuous welding, such as those heretofore used to produce round tubing, cannot profitably be used at present for polygonal tubes for several other reasons.

For example, until the present, continuous welding procedures using helium or argon shielding was limited by the rate at which heat can be applied; consequently high production speeds were not possible. High-frequency resistance welding, however, produces only localized heat at higher intensity, thus permitting high speed continuous seam welding of sections which cannot be fabricated at lower heating rates. This method of welding is equally applicable to ferrous and non-ferrous metals, including 100 percent pure, high conductivity copper, stainless and galvanized steel, hot and cold rolled steel, and rare earth metals, using the same welding head. No descaling, flux or filler rod is needed.

In the present welding method, heat is concentrated on the actual edges of the metal being welded, which reduces distortion and strains in adjacent metal which otherwise occured with conventional welding heretofore, and also requires less pressure.

All of the above makes possible the present concept of roll-forming polygonal tubing direct from metal strip with the weldment at one corner. Heretofore, polygonal tubing was restricted to that having the weldment as a seam on one of the sides, since the round seamed tubing is not readily bent along the seam. Moreover, the present concept makes possible the rapid production of perforated and/or knockout tubing by providing the perforation and/or knock-out forming step prior to forming. Heretofore this was not possible because of the distortions produced in the round tube formation and the welding step which destroys the shape of the perforation and/or dislodges the knockout. Thus, conventional tubing which must be perforated or provided with knock-outs after fabrication has numerous drawbacks, compared with the present method. Drilling of holes leaves burrs difficult to remove and punching of, for example, rectangular holes is diffi-

2 cult and expensive as done at present. Furthermore, perforations and/or knockouts are not readily made on that side having the weldment, whereas all sides of the present corner-welded tube may be perforate or provided with knockouts.

Perforated sides in polygonal tubing is highly desirable for assembling with fittings and/or other tubing to produce structural frames and the like without welding the parts together. With the present tubing, connections made on any side will not be interfered with by the weld seam which is at the corner. In conventionally manufactured tubing, at least one side, the side with the seam, cannot be so used for connections.

The attainment of all the foresaid advantages in the manufacture of polygonal tubing is therefore the primary object of the present invention. Other objects and advantages will be readily apparent to one skilled in the art to which the invention pertains upon reference to the accompanying drawing illustrating a preferred embodiment of the invention in which like characters refer to like parts throughout the several views and in which—

FIG. 1 is a diagrammatic representation of a preferred production line for manufacture of tubing according to the method of the present invention.

FIG. 2 is a cross-sectional view of the metal strip after perforation taken substantially on the line 2—2 of FIG. 1.

FIG. 3 is a cross-sectional view of the strip at one forming stage taken substantially on the line 3—3 of FIG. 1.

FIG. 4 is a cross-sectional view of the tube just prior to seam welding taken substantially on the line 4—4 of FIG. 1.

FIG. 5 is an enlarged fragmentary cross-sectional view of the corner weldment just after welding.

FIG. 6 is a fragmentary elevational view of a perforated tubing section,

FIG. 7 is an end view, partially in cross-section, illustrating a set of telescoping tubes, and FIG. 8 is a fragmentary cross sectional view of a preferred modification showing a knockout.

Referring to FIG. 1, a preferred production line setup is illustrated diagrammatically as comprising first a cradle means 10 adapted to carry a large coil of strip sheet metal 11.

Controlled speed power uncoilers and levelers 12 and 13 preferably draw the strip past a welding means 14 adapted for butt-welding the trailing end of one coil to the lead end of the next coil and through a perforating or knockout producing means 15, preferably a punch press having a plurality of punches 15A. For perforations, slugs are punched out completely, but for knockout-forming the slugs are only partially punched out.

The strip 11 is next fed into a power feed roll-forming means 16 after passing a special marking press 17. The marking press has a counter which counts perforations and may make a special cut-off perforation intermediate selected primary perforations or knockouts depending on the length of finished tubing desired. The perforations or knockouts must be held to close module spacing tolerances, and all successive operations are carefully controlled to reduce distortion so that the finished tubing will have uniformly and accurately spaced perforations or knockouts positioned at uniform distances from the end of the selected length of tubing. Where knockouts have been formed, they are rolled back into place during the roll forming process so that they act to restore to the tubing a substantial degree of strength otherwise lost in perforated tubing. To achieve this result, the knockout must, when replaced, engage the peripheral edge of the hole.

The rollers 16A of the roll-forming means 16 form the strip directly to polygonal, or in the present case shown, square tubing, forming longitudinal corners at the lines 11A intermediate the longitudinally spaced rows of perforations 11B or knockouts 11F which in the present case are made on each side of the tubing.

The side edges 11C of the strip 11 are slightly bent so that their surfaces will meet on a radial plane to form the fourth or weldment corner.

An ultrahigh-frequency welding means 18, utilizing the principles set out in Patent Nos. 2,794,108 and 2,818,488 continuously welds the edges 11C together. This or any other welding process which may be used produces flash material 11D which protrudes outwardly and inwardly from the seam as seen in FIG. 5. The outer flash material is removed by passing the finished tube through a scarfing means 19. A sizing roll means 20 is preferably next provided to assure that the finished tubing is straight, and a cutoff means 21 triggered on the special modulated perforation made by the marking press rather than on length as is customary operates to cut the tubing into the selected sections. The cutoff is preferably either made to pass through the center of the perforations 11B, or is made, as seen in FIG. 6, such that the dimension X from the cutoff end 11E to the first perforation center is one-half the module dimension Y between adjacent perforation centers. This makes for standardization through module uniformity.

In actual production, hole to hole or knockout to knockout modular distance on one-inch centers can be maintained for steel tubing to such close tolerance as to keep an overall tolerance in a 10 to 20 foot length of, for example, plus or minus $1/16$ inch, with the line running at speeds of 100 feet per minute and more.

The roll forming means 16 being power fed, foot per minute speed accuracy is maintained at plus or minus .030 tolerance to prevent lengthwise distortion.

Only by corner welding can the perforations be initially made on all sides, and by utilizing the present special welding distortions can be reduced sufficiently to make the present method practical.

In ultrahigh-frequency resistance welding, the contact areas are small, voltage higher and current less, producing heat only on the surfaces and eliminating need for high pressure contact. After welding, the tubing size is within .010 to .015 inch of design.

The present method thus makes possible the high speed manufacture of a new article of manufacture comprising a polygonal perforated tubing having a weldment corner. It also makes possible the production of a set of telescoping tubing as shown in FIG. 7.

FIG. 7 illustrates tubes 25, 26, 27 and 28 respectively increasing the size. The exterior of the corners being rounded as shown, the flash material 11D protruding from the inner weldment corners will not interfere with the insertion of the smaller tubes into the larger as it would if the weldment were on a side as heretofore has been the case. The sides of concentric tubes are spaced a distance about the same as or less than the protruded flash material, but with the corner welding no problem of interference exists.

The ability to manufacture a set of such tubes permits their use one within the other and with all sides perforated or provided with knockouts on the same modules, the perforations and/or knockouts and their distances from the tubing ends produce close alignment of one tube's perforations and/or knockouts with the others, as seen in FIG. 7. Uses and versatility of such a set of tubes are limitless, but heretofore it was never possible to manufacture them at high production rates if at all.

The idea of providing a counter in the line ahead of the forming rolls which will count perforations and knockouts, along with the provision of a cut-off means triggered on the count desired rather than length is also considered unique and produces results heretofore not contemplated in the production of longitudinal formed members of any cross-sectional shape, such as angles, channels, and others.

Although only one embodiment of the invention has been disclosed, it will be apparent to one skilled in the art that various changes and modifications may be made therein without departing from the spirit of the invention as expressed by the scope of the appended claims.

I claim:
1. A set of telescoping elongated tubular members for load carrying structures,
    (a) said members having geometrically similar polygonal transverse cross sections defined by pluralities of flat sides and longitudinal corners,
    (b) one corner of each member being a weldment joining adjacent sides of the member,
    (c) each of said weldment corners having a longitudinal inner protrusion of flash material and an outer surface,
    (d) the outer surfaces of all of the corners of said members being substantially uniformly arcuate in transverse cross-section, and
    (e) each member when said members are concentrically disposed having outer side surfaces dimensioned from the inner side surfaces of the next larger member by an amount close to or less than the extent of flash material protrusion from the weldment corner, whereby the location of said protrusion at the corner obviates interference with the next inner tubular member.

2. The set of members as defined in claim 1 and in which at least one flat side of each member has a longitudinal row of spaced perforations or knockouts.

3. The set of members as defined in claim 2 in which said perforations or knockouts in each member are equally spaced and aligned with the perforations or knockouts in each other member.

References Cited by the Examiner

UNITED STATES PATENTS

| | | | |
|---|---|---|---|
| 989,069 | 4/1911 | Siewert | 52—632 |
| 2,888,111 | 5/1959 | Evans | 52—114 |
| 2,950,376 | 8/1960 | Wogerbauer | 219—67 |
| 2,967,594 | 1/1961 | Deam | 189—36 |
| 2,983,342 | 5/1961 | Howard | 52—27 |
| 3,015,018 | 12/1961 | Rudd | 219—67 |
| 3,020,631 | 2/1962 | Kennedy | 29—417 |
| 3,066,401 | 12/1962 | Morel et al. | 29—417 |

FOREIGN PATENTS

| | | |
|---|---|---|
| 231,211 | 6/1959 | Australia. |
| 752,539 | 7/1933 | France. |

FRANK L. ABBOTT, *Primary Examiner.*

JOSEPH V. TRUHE, RICHARD W. COOKE, JR.,
*Examiners.*

R. S. VERMUT, *Assistant Examiner.*